United States Patent [19]

Lee

[11] Patent Number: 5,758,544

[45] Date of Patent: Jun. 2, 1998

[54] SYSTEM AND METHOD FOR LOCKING OUT AN OUTPUT DEVICE WHEN AN INPUT DEVICE IS ACTUATED

[75] Inventor: Jimmy Lee, Woodland Hills, Calif.

[73] Assignee: P. L. Porter Co., Woodland Hills, Calif.

[21] Appl. No.: 629,897

[22] Filed: Apr. 10, 1996

[51] Int. Cl.[6] .................................................. G05G 11/00
[52] U.S. Cl. .................................. 74/483 R; 74/483 PB; 74/502.6
[58] Field of Search ................... 74/483 R, 483 PB, 74/500.5, 502.4, 502.6; 292/252, DIG. 25

[56] References Cited

U.S. PATENT DOCUMENTS

| | | | |
|---|---|---|---|
| 3,346,291 | 10/1967 | Massal | 292/252 |
| 3,752,007 | 8/1973 | Blondeleau | 74/492 |
| 4,127,966 | 12/1978 | Schmidt | 292/252 |
| 4,702,094 | 10/1987 | Peterson | 292/DIG. 25 |
| 4,872,367 | 10/1989 | Spease | 74/502.6 |
| 4,917,418 | 4/1990 | Gokee | 74/502.6 |
| 5,002,172 | 3/1991 | Stringer | 192/142 R |
| 5,133,245 | 7/1992 | Lee | 92/13.4 |
| 5,134,896 | 8/1992 | Viazanko | 74/483 R |
| 5,263,751 | 11/1993 | Priest | 292/252 |
| 5,419,616 | 5/1995 | Paetzold | 292/DIG. 25 |
| 5,429,217 | 7/1995 | Stringer | 188/300 |
| 5,535,608 | 7/1996 | Brin | 292/DIG. 25 |
| 5,542,891 | 8/1996 | Kettle | 74/483 R |
| 5,544,508 | 8/1996 | Torkowski | 292/DIG. 25 |

*Primary Examiner*—Charles A. Marmor
*Assistant Examiner*—David M. Fenstermacher
*Attorney, Agent, or Firm*—Oppenheimer Wolff & Donnelly LLP

[57] ABSTRACT

The lockout mechanism selectively prevents passengers from reclining an airplane seat even though they activate the seat's recline input button. Instead of a single cable extending from the recline button to the recline actuator, the invention has separate input and output cables. The input cable attaches to a cylindrical input fitting, and the output cable attaches to a cylindrical output fitting. The input fitting telescopes within the output fitting. A ball, which is adjacent the output fitting, moves between a lockout and a normal position. In the normal position, the ball secures the input and output fittings together so that the input and output cables move together. Therefore, pushing the recline button activates the recline actuator. When the ball is in the lockout position, the fittings telescope relative to each other. Therefore, pushing the seat recline button does not activate the recline actuator. A remotely activated piston cam moves the ball between the normal and lockout positions.

42 Claims, 3 Drawing Sheets

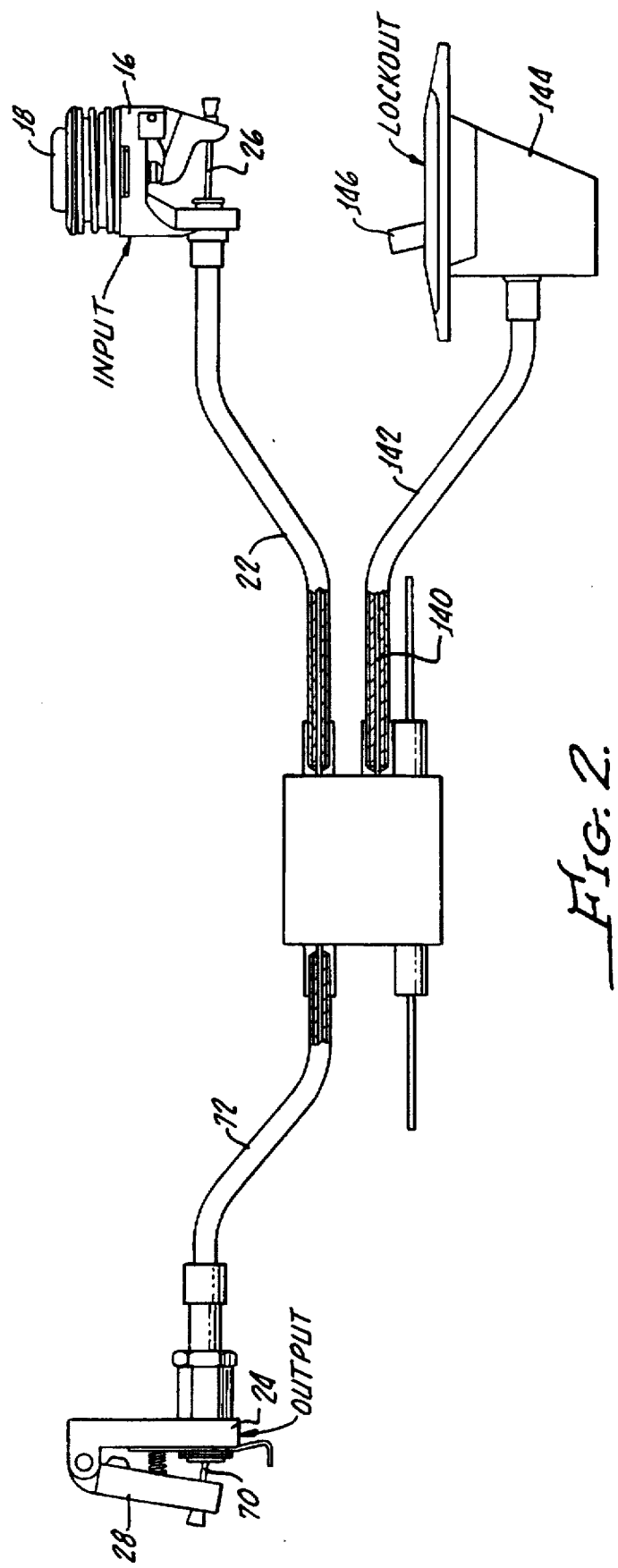

SYSTEM AND METHOD FOR LOCKING OUT AN OUTPUT DEVICE WHEN AN INPUT DEVICE IS ACTUATED

BACKGROUND OF THE INVENTION

1. Field of the Invention

The present invention locks out an output device when an input device is activated. The input device normally activates the output device More specifically, the invention has its greatest applicability for commercial airplane seats. It selectively prevents the input button on a seat from activating the recline actuator. Thus, if the lockout mechanism is activated, passengers cannot recline their seats.

2. State of the Art

Most commercial airplane passenger seats recline. Most government agencies that police airplane safety including the United States Federal Aviation Administration have regulations governing seat location relative to seat rows adjacent window exits and the recline of those seats. These regulation prohibit the row of seats in front of exit rows to recline if the reclined seat would interfere with passengers trying to use the window exit.

Exit row clearance is important mainly during takeoffs and landings. Allowing passengers in front of the exit row to recline when the airplane is cruising is not risky. Accordingly, it would be beneficial to permit these passengers to recline their seats after takeoff and before landing but to prevent them from reclining during takeoffs and landings. This benefit is especially important for long trips in which the passenger may be uncomfortable if not allowed to recline.

There are many seat recline actuators, and many are applicable for airplane seats. Stringer, et. al. U.S. Pat. No. 5,429,217 (1995), and Lee, et. al. U.S. Pat. No. 5,133,245 (1992) are two examples. Electric motors recline some seats, and flight attendants can disengage those motors for some seats. Stringer, U.S. Pat. No. 5,002,172 (1991) is an example of an electrically actuated seat actuator.

SUMMARY OF THE INVENTION

The principal object of the present invention is to disclose and provide a lockout system and method that selectively prevents passengers from reclining their seats. Specifically, an object of the present invention is to disclose and provide such a lockout device that is light weight, easy to use, inexpensive and easy to assemble and maintain.

The present invention's lockout mechanism selectively prevents normal input from an input device, such as a passenger seat recline button, to an output device, such as a seat actuator, from activating the actuator. The lockout mechanism includes an input cable that connects to the input device and an output cable that connects to the output device. Each cable can move in two directions. An input cable fitting attaches to the input cable. The input cable fitting permits the input cable to move relative to the input cable fitting when the input cable moves in one direction. The fitting moves with the input cable when the input cable moves in the other direction. Likewise, an output cable fitting attaches to the output cable. The output cable fitting permits movement of the output cable relative to the output cable fitting when the output cable moves in one direction. The output fitting moves with the output cable when the output cable moves in the other direction.

A ball, which is adjacent the input cable fitting and the output cable fitting, can either hold or release the two fittings. When the ball holds the two fittings together, they move together. Therefore, movement of the input cable is transmitted through the two fittings and into movement of the output cable. On the other hand, when the ball is in its lockout position, the two fittings can slide relative to each other. Therefore, when a passenger activates the input device and the input cable, movement of the input fitting does not move the output fitting. Therefore, the output device is not activated.

A cam member adjacent the ball moves the ball between its normal and its lockout position. The cam is remotely activated by a flight attendant.

The previously-mentioned objects and other objects of the invention may be seen more clearly from the preferred embodiment's detailed description that follows.

BRIEF DESCRIPTION OF THE DRAWINGS

FIG. 2 is a side elevation in partial section of the seat control system that contains of the lockout mechanism of the present invention.

DETAILED DESCRIPTION OF THE PREFERRED EMBODIMENTS

Several companies make hydraulic and mechanical actuators for allowing an airplane seat to recline. One such actuator is the Hydrolok actuator, sold by P. L. Porter Co., assignee of the present invention. The following patents describe features of the Hydrolok or features of actuators for seats: Stringer, et. al. U.S. Pat. No. 5,429,217 (1995), and Lee, et. al. U.S. Pat. No. 5,133,245 (1992).

Figure 1:
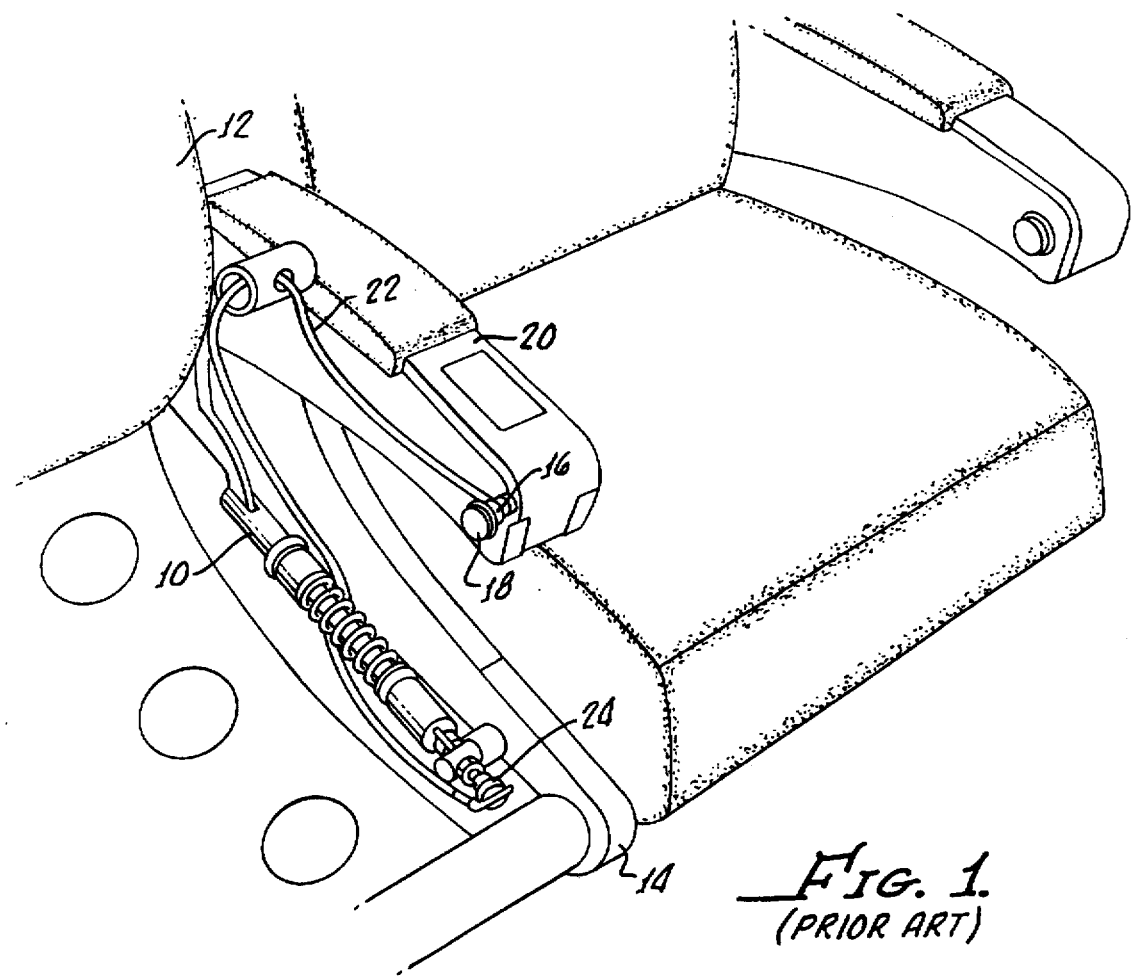
FIG. 1 is a perspective view of a prior art seat actuator shown on a row of seats.

FIG. 1 shows a prior art seat actuator 10 mounted on an airplane seat 12 on a row 14 of such seats. Input member 16 has a button 18 that projects from the seat's armrest 20. When a passenger pushes the button, the input member pulls a cable within sheath 22. That, in turn, activates an output member 24 on actuator 10 to release the back of the seat and allow the seat back to recline or return to the upright position.

FIG. 2 shows an exemplary embodiment of the present invention. A cable 26 in sheath 22 pulls to the right when a passenger pushes button 18. In the prior art, the cable extends from the actuator input member 16 directly to the actuator output member 24. See FIG. 1. Thus, as the cable moves to the right, it pulls lever 28 on the output member. That lever controls the output actuator.

Figure 4:
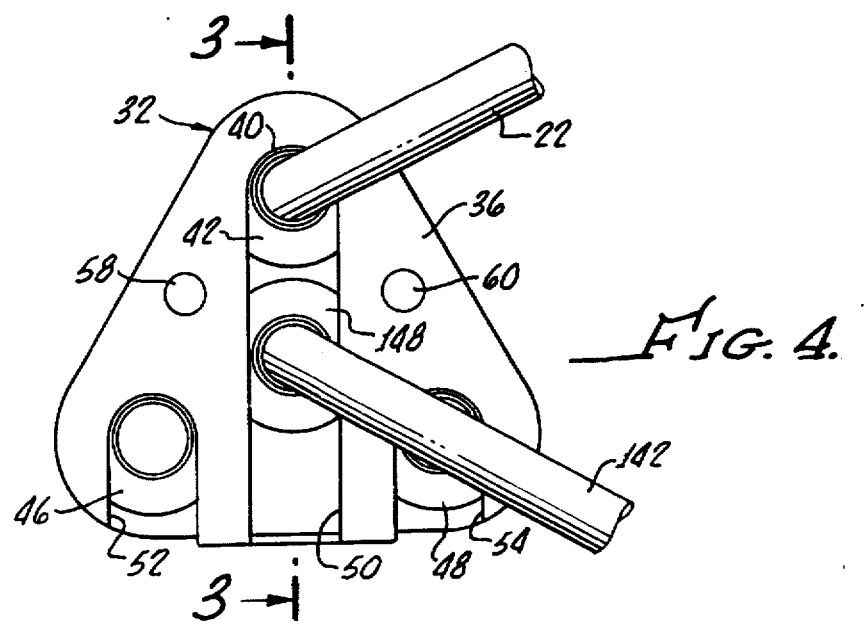
FIG. 4 is an end view of the housing of the lockout mechanism of the present invention.
Figure 3:
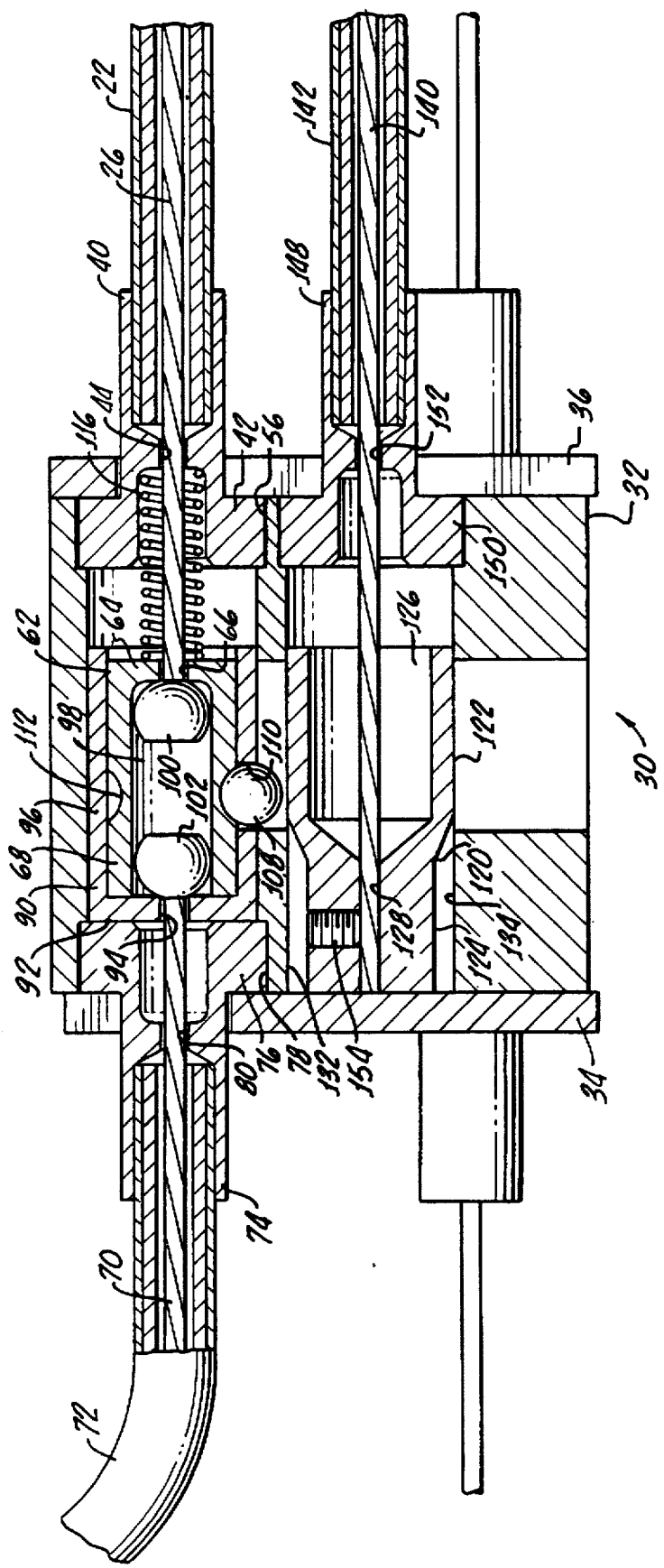
FIG. 3 is a side sectional elevation of the lockout mechanism of the present invention.

FIGS. 3 and 4 show the details of the exemplary embodiment of the present invention's lockout mechanism. Housing 32 houses the lockout mechanism 30 (FIG. 3). The housing has two triangular end walls 34 and 36 (see FIG. 4). A thin cover may extend between the end walls and covers the lockout mechanism's internal parts. Aluminum is the preferred material for the most of the parts including the housing and end walls.

As FIG. 3 shows, the sheath 22 surrounding input cable 26 is fixed to ferrule 40. Aluminum is the preferred material for the ferrule. The ferrule has shoulder 42 that fits inside end wall 36 in ferrule receiving opening 56 in housing 32. The ferrule also has a central opening 44 through which cable 26 passes.

Commercial airplanes have no more than three seats between the window and the aisle. The present invention is designed to lockout all the seats in a row, up to three. Separate input and output cables control each seat. FIG. 3 shows only one set of cables and sheaths. FIG. 4 does show ferrules 46 and 48 for the respective sheaths. End wall 36 has a central slot 50 and two side slots 52 and 54 (FIG. 4). After an assembler attaches the ferrules' shoulders 42, 44 and 46 to openings in the housing (FIG. 3 only shows opening 56), the assembler slides slots 42, 44 and 46 over the shoulder (FIG. 4). Screws or bolts (not shown) extend through openings 58 and 60 (FIG. 4) into taped openings in the housing to secure cover 36 to the housing.

An output cable 70 in sheath 72 extends between output actuator 24 and the lockout mechanism (FIGS. 2 and 3). Sheath 72 attaches to ferrule 74. Shoulder 76 of the ferrule fits inside end wall 34 in an opening 78 in housing 32 (FIG. 3). Cable 70 passes through the ferrule's central opening 80. Except for the position of the ferrule 76 (and other ferrules such as ferrule 82), assembly of the output cables and their respective ferrules is similar to assembling the input cables and their ferrules.

The lockout mechanism of the present invention includes an input cable fitting attached to input cable 26. The input cable fitting permits movement of the input cable relative to the input cable fitting when the input cable moves in one direction. The input cable fitting moves with the input cable when the input cable moves in the other direction. In the exemplary embodiment, the input cable fitting is a cylinder 62. The cylinder has a base 64, which has a central hole 66 and an upstanding cylindrical wall 68 (FIG. 3).

Similarly, the lockout mechanism also includes an output cable fitting attached to an output cable 70. The output cable fitting allows the output cable to move relative to the output cable fitting in one direction. The fitting and the output cable move together when the output cable moves in the other direction. In the exemplary embodiment (FIG. 3), the output cable fitting is a cylinder 90. The cylinder has a base 92. The base has central hole 94. An upstanding cylindrical wall 96 extends up from base 92. As FIG. 3 shows, output cylinder 90 receives input cylinder 62 through the output cylinder's open end. The bases 64 and 92 of the respective cylinders are spaced apart leaving a space 98 between the bases. Thus, in the exemplary embodiment, the output cylinder is an outer cylinder and the input cylinder is an inner cylinder.

Although the exemplary embodiment uses cylinders as the input and output fittings, each fitting could have a base that is not circular and have flat, upstanding walls. Also, with changes of attaching the fittings to the cables, the fittings could be interlocking plates or curved or angled members that slide relative to each other.

Cable 26 passes through opening 44 in ferrule 40 into housing 32. The end of the cable extends through opening 66 in the base of input cylinder 62. The end of the cable has a large end 100 that fits inside input cylinder 62 (FIG. 3). The large end acts as means to prevent the left end (FIG. 3) of the cable from pulling back through opening 66. While the exemplary embodiment shows the end of the cable to be an integral part of the cable, one could use a separate fitting attached to the cable. One also could tie a knot in the cable end. Similarly, output cable 70 passes into the housing through ferrule 74. The end of the output cable extends through opening 94 in output cylinder 90. As FIG. 3 shows, the end of the output cable also has a large end 102 that fits inside the open end of input cylinder 62 and in the output cylinder 92 (FIG. 3). The two cable ends 100 and 102 are spaced apart within space 98.

The present invention's lockout mechanism also includes a moveable member adjacent the input cable fitting and the output cable fitting. The moveable member can move at least partially moveable through the openings in the cylindrical walls 68 and 96 of the input and output cylinders. In the exemplary embodiment, the moveable member is a ball 108, but it can be a shape other than spherical. Also, it does not have to be freely moveable. The moveable member could be mounted at a fixed position and part of the member could pivot into the openings in the cylindrical walls.

The cylindrical wall 96 of output cylinder 90 has an opening 110, which is sized to receive the ball. When the two cylinders 64 and 92 are in the position shown in FIG. 3, opening 110 aligns with a circumferential groove 112 in the input cylinder 64 (FIG. 3). Therefore, when the ball extends at least partially through opening 110, it seats in groove 112. When that occurs, the moveable member secures the two cylinders together. This application refers to this position or orientation as a "normal" or "locked" one.

The exemplary embodiment shows the ball seating in a groove 112. Other means for receiving the ball could replace the groove. For example, a series of circumferentially-spaced indentations of any desired shape can receive the ball 108. Additionally, the indentations could be holes in the side wall 68 spaced around the sidewall. Also, if the input cylinder does not rotate relative to the output cylinder, a single indentation or opening in the input cylinder could replace groove 112.

When the two cylinders move together and when a passenger activates the input member 16 (FIG. 2), input cable 26 pulls to the right (FIG. 3). That, in turn, pulls the two cylinders 64 and 92 and ball 108 to the right. Movement of the output cylinder 90 to the right pulls output cable 70 to the right. The output cable then pulls lever 28 on the output actuator 24 (FIG. 2), which releases the seat back 12 (FIG. 1).

The ball 108 can move out of groove 112 in a manner discussed below. When that occurs, the input and output cylinders 64 and 92 slide or telescope relative to each other. This application refers to this position or orientation as the "lock out" one. That is, when a passenger activates the input member 16 (FIG. 2), input cable pulls to the right (FIG. 3). While that pulls input cylinder 64 to the right, output cylinder 92 remains stationary. Accordingly, output cable 70 does not act on the output actuator, and the passenger's seat does not recline.

Normally, seat actuator 24 is spring loaded. Spring bias of the seat actuator pulls output cable 70 to the left (FIG. 3). When the two cylinders move together, this pull on the cable provides a spring bias to the input cable 26 and to the button 18. Therefore, when a passengers pushes the button, it returns to a normal position when it is released and conveys a feel similar to the button's feeling on a conventional seat. If the ball 108 is in the lockout position so that the cylinders slide relative to each other, the output member does not transmit the bias to input cable 26 and the seat button 18. So that the present invention may have the same feel as a conventional seat button, the present invention has a return compression spring 116. The spring extends between ferrule 40 and base 64 of cylinder 62. Thus, if the passenger pushes the button, the return spring urges cylinder 62 to the left. The cable 26 also pulls to the left and applies a normal restoring force on the button.

The present invention includes a cam member adjacent to the moveable member. In the exemplary embodiment, the cam member is an aluminum piston 120 (FIG. 3). The piston has a wider diameter section 122 and a narrower diameter section 124. These sections are coaxial. The wider section is hollow at 126 for weight reduction. Also, an opening 128 extends through the narrower section. Piston 120 can slide laterally (FIG. 3) between walls 132 and 134 of housing 32. The axis of the cylindrical sections are parallel to the direction of motion of the cable fittings 62 and 90.

A lockout cable 140 in sheath 142 (FIG. 3) extends between the lockout actuator 144 (FIG. 2) and the housing. The sheath attaches to ferrule 148, and the ferrule's shoulder 150 seats in an opening in the housing between the housing and outer wall 36 (FIGS. 3 and 4). Lockout cable 140 extends through opening 152 in ferrule 148 and is received in opening 128 in piston 120. Set screw 154 secures the lockout cable to the piston.

If a flight attendant wishes to prevent seats with the present invention from reclining, he or she throws lever 146 on the lockout actuator 144 (FIG. 2). Lever 146 has an over-center configuration (not shown) that holds the lever in a lockout position.

The lockout actuator 144 and the lockout cable 140 positions the cam or piston 120 between a lockout position permitting the moveable member or ball 108 to be in the lockout position to release the input cable fitting and the output cable fitting from each other and a normal position positioning the moveable member in the normal or locked position, to secure the input cable fitting and the output cable fitting together. FIG. 3 shows the normal position of the ball in the exemplary embodiment. The wider diameter portion of the piston pushes ball 108 through opening 110 in output cylinder 90 and into groove 112 on input cylinder 62.

As the input and output cylinders 62 and 90 move to the right (FIG. 3), ball 108 slides along the surface of the piston's wider diameter portion 122. Consequently, the input and output cylinders move together. Therefore, the input and output cables transmit passenger actuation of the recline button 18 to the output device 24 to release the seat.

When the flight attendant throws lever 146, the lockout actuator pulls cable 140. That pulls piston 120 to the right (FIG. 3). The piston moves freely because of its fit between walls of the housing. When the piston moves to the right, the piston's narrower-diameter section 124 moves under ball 108. This permits the ball to move out of groove 112 on the inner cylinder. Because the ball no longer holds the two cylinders together, the cylinders can move relative to each other. Therefore, when a passenger tries to recline the seat, input cable 26 moves, but output cable 70 remains stationary. The seat does not recline.

The lockout mechanism's lever 146 is mounted out of reach or out of sight of passengers seated in seat 12 but within reach of a flight attendant. For example, the lockout mechanism could be mounted on the bottom of the seat near the aisle. Alternatively, the lockout mechanism could be remotely controlled. In that case, an electrical or hydraulic lockout mechanism replaces the manual one shown in the exemplary embodiment. It is best if the lever also is out of reach and not seen by the passenger in the row behind the one with the lockout mechanism. Finally, using remote control, an airline could use the present invention on all seats and lockout all reclining during takeoff and landing.

Numerous modifications and alternate embodiments will occur to those skilled in the art. Therefore, applicant intends that the invention be limited only in terms of the appended claims.

I claim:

1. A lockout mechanism for an actuator for selectively preventing normal input from an input device to an output device of the actuator from activating the actuator's output device, the lockout mechanism comprising:

a. an input cable connectable to the input device and an output cable connectable to the output device, each of the cables being moveable in two directions;

b. an input cable fitting attached to the input cable, the input cable fitting permitting movement of the input cable relative to the input cable fitting when the input cable moves in one direction, the input cable fitting moving with the input cable when the input cable moves in the other direction;

c. an output cable fitting attached to the output cable, the output cable fitting permitting movement of the output cable relative to the output cable fitting when the output cable moves in one direction, the output cable fitting moving with the output cable when the output cable moves in the other direction;

d. a moveable member adjacent the input cable fitting and the output cable fitting, the moveable member being moveable between a normal and a lockout position, the moveable member securing the input cable fitting and the output cable fitting for movement together when the moveable member is in the normal position, the input cable fitting and the output cable fitting being moveable relative each other when the moveable member is in the lockout position, the input cable and the output cable moving together when the input cable fitting and the output cable fitting move together;

e. a cam member adjacent to the moveable member, the cam being positionable between a lockout position permitting the moveable member to be in its lockout position to release the input cable fitting and the output cable fitting from each other and a normal position positioning the moveable member in the normal locked position, to secure the input cable fitting and the output cable fitting together.

2. The lockout mechanism of claim 1 wherein the lockout mechanism is mounted in a housing, a ferrule, a sheath at least partially around the input cable, the sheath attaching to the ferrule, the housing having a space, and the ferrule received within the housing space.

3. The lockout mechanism of claim 1 wherein the input cable fitting has a base and sidewalls extending from the base of the input fitting, the output cable fitting having a base and sidewalls extending from the base of the output fitting, the end of the sidewalls of the input cable fitting being inside the sidewalls and against the base of the output cable fitting.

4. A control system for remote activation of an actuator comprising:

a. an output device attachable to the controlled member and an output cable connected to the output device, the output cable being retractable to activate part of the output device;

b. an input device and an input cable connected to the input device, the input device have an actuator, the actuator selectively retracting the input cable; and c. lockout means attached to the input and output cables switchable between an unlocked position permitting the output cable to retract when the input cable retracts and a locked position preventing the output cable from retracting when the input cable retracts.

5. The lockout mechanism of claim 4 further comprising an opening through the input fitting, and an opening through the output fitting, the input cable extending through the opening in the input cable fitting and the output cable fitting extending into the opening in the output cable fitting.

6. A method for locking an actuator so that normal remote activation of an input for the actuator does not activate an output for the actuator, the method comprising:

the input pulling a first cable, the actuator being activated by the pulling of a second cable, connecting the two cables in one mode for movement together so that the first cable moves the second cable and the actuator activates the output of the actuator and in a second mode releasing the two cables from movement together so that the first cable moves without moving the second cable so that the actuator does not activate the output of the actuator.

7. The lockout mechanism of claim 6 wherein the opening through the input fitting and the opening through the output fitting are both located at the longitudinal axis of the respective cable fitting.

8. A lockout mechanism for an actuator for selectively preventing normal input from an input device to an output device of the actuator from activating an output device of the actuator, the lockout mechanism comprising:

a. an inner cable fitting nested within an outer cable fitting, the inner cable fitting having a closed end and a wall extending to an open end, the outer cable fitting having a closed end and a wall extending to an open end, the open end of the inner cable fitting facing the closed end of the outer cable fitting;

b. the closed end of the inner cable fitting receiving an end of a cable that attaches to one of the devices and the closed end of the outer cable fitting receiving an end of a cable that attaches to the other device;

c. the wall of the inner cable fitting and the wall of the outer cable fitting each having an opening aligned with the opening in the wall of the other cable fitting;

d. a moveable member at least partially moveable through the openings in the walls of the cable fittings, the moveable member securing the inner and outer cable fittings for movement together when the moveable member is in both openings, the inner cable fitting being moveable relative to the outer cable fitting when the moveable member is not in both openings;

e. a cam member adjacent to the moveable member, the cam being positionable between a lockout position permitting the moveable member to be out of both openings to release one cable fitting member from the other and a normal position positioning the moveable member in both openings.

9. A control system for remote activation of an actuator comprising:

a. an output device attachable to the controlled member and an output cable connected to the output device, the output cable being retractable to activate part of the output device;

b. an input device and an input cable connected to the input device, the input device have an actuator, the actuator selectively retracting the input cable; and c. lockout means attached to the input and output cables switchable between an unlocked position permitting the output cable to retract when the input cable retracts and a locked position preventing the output cable from retracting when the input cable retracts.

10. The control system of claim 9 wherein the lockout means comprises an inner cable fitting nested within an outer cable fitting, the inner cable fitting having a closed end and an open end, the outer cable fitting having a closed end and an open end, the open end of the inner cable fitting facing the closed end of the outer cable fitting, an end of the input cable and an end of the output cable extending into the inner cable fitting, one of the cables extending through the closed end of the inner cable fitting and the other cable extending through the closed end of the outer cable fitting, each cable having an end member for moving the cable fitting member through the closed end of which the cable extends; the inner and outer cable fitting each having an opening aligned with the opening on the other cable fitting, a moveable member at least partially moveable through the openings, the moveable member securing the inner and outer cable fittings for movement together when the moveable member is in both openings, the inner cable fitting being moveable relative to the outer cable fitting when the moveable member is not in both openings; a cam member adjacent to the moveable member, the cam being positionable between a lockout position permitting the moveable member to be out of both openings to release one cable fitting from the other and a normal position positioning the moveable member in both openings.

11. The control system of claim 9 wherein the lockout means is mounted in a housing, the housing forming a space that receives the inner and outer cable fittings.

12. The control system of claim 9 wherein the lockout means is mounted in a housing, a ferrule, a sheath at least partially around the input cable, the sheath attaching to the ferrule, the housing having a space, and the ferrule received within in ferrule.

13. The control system of claim 12 further comprising an end wall attached to the housing, the end wall having a slot though which a portion of the ferrule extends.

14. The control system of claim 9 wherein the inner cable fitting has a base and sidewalls extending from the base of the inner cable fitting, the outer cable fitting having a base and sidewalls extending from the base of the outer cable fitting, the end of the sidewalls of one of the cable fittings being inside the sidewalls and against the base of the other cable fitting.

15. The control system of claim 14 further comprising an opening through each of the cable fittings, the input cable extending through the opening in the inner cable fitting and the outer cable fitting extending into the opening in the outer cable fitting.

16. The control system of claim 15 further comprising means on the input cable preventing the input cable from being pulled through the opening in the inner cable fitting.

17. The control system of claim 9 wherein the inner cable fitting is cylindrical, and the outer cable fitting is cylindrical, the inner cable fitting having a base and a sidewall extending from the base of the inner cable fitting, the outer cable fitting having a base and a sidewall extending from the base of the outer cable fitting, the end of the sidewall of one of the cable fitting being inside the sidewall of the other cable fitting and against the base of the other cable fitting.

18. The control system of claim 17 further comprising an opening in the side wall of the inner cable fitting, an indentation in the side wall of the outer cable fitting, the moveable member moving through the opening in the side wall of the outer cable fitting into the indentation in the side wall of the inner cable fitting.

19. The control system of claim 18 wherein the moveable member is a ball mounted in the housing, a cam member adjacent to the moveable member, the cam being positionable between a lockout position permitting the moveable member to be out of both the opening in the side wall of the inner cable fitting and the indentation to release one cable fitting from the other and a normal position positioning the moveable member in both openings, the cam member being mounted in the housing opposite the opening in the side wall of the inner cable fitting.

20. The control system of claim 19 wherein the cam member is elongated and has two cylindrical surfaces, one surface having a larger diameter than the other surface.

21. The control system of claim 20 wherein the two cylindrical surfaces are coaxial, the axis of the cylindrical surfaces being parallel to the direction of motion of the cable fittings.

22. A lockout mechanism for an actuator for selectively preventing normal input from an input device to an output device of the actuator from activating the actuator, the lockout mechanism comprising:

a. an inner cable fitting nested within an outer cable fitting, the inner cable fitting having a closed end and a wall extending to an open end, the outer cable fitting having a closed end and a wall extending to an open end, the open end of the inner cable fitting facing the closed end of the outer cable fitting;

b. the closed end of the inner cable fitting receiving an end of a cable that attaches to one of the devices and the closed end of the outer cable fitting receiving an end of a cable that attaches to the other device;

c. the wall of the inner cable fitting and the wall of the outer cable fitting each having an opening aligned with the opening in the wall of the other cable fitting;

d. a moveable member at least partially moveable through the openings in the walls of the cable fittings, the moveable member securing the inner and outer cable fittings for movement together when the moveable member is in both openings, the inner cable fitting being moveable relative to the outer cable fitting when the moveable member is not in both openings;

e. a cam member adjacent to the moveable member, the cam being positionable between a lockout position permitting the moveable member to be out of both openings to release one cable fitting member from the other and a normal position positioning the moveable member in both openings.

23. The lockout mechanism of claim 22 wherein the lockout mechanism is mounted in a housing, the housing forming a space that receives the inner cable fitting and the outer cable fitting.

24. The lockout mechanism of claim 22 wherein the inner cable fitting has a base and sidewalls extending from the base of the inner cable fitting, the outer cable fitting having a base and sidewalls extending from the base of the outer cable fitting, the end of the sidewalls of one of the inner cable fitting being inside the sidewalls and against the base of the outer cable fitting.

25. The lockout mechanism of claim 24 wherein the two cylindrical surfaces are coaxial, the axis of the cylindrical surfaces being parallel to the direction of motion of the cable fittings.

26. The lockout mechanism of claim 22 wherein the lockout mechanism is mounted in a housing, the housing forming a space that receives the input and output fittings.

27. The lockout mechanism of claim 26 wherein the lockout mechanism is in a housing, a ferrule, a sheath at least partially around the input cable, the sheath attaching to the ferrule, the housing having a space, and the ferrule received within the housing space.

28. The lockout mechanism of claim 26 wherein the inner cable fitting is cylindrical, and the outer cable fitting is cylindrical, the inner cable fitting having a base and a sidewall extending from the base of the inner cable fitting, the outer cable fitting having a base and a sidewall extending from the base of the outer cable fitting, the end of the sidewall of the inner cable fitting being inside the sidewall and against the base of the outer cable fitting.

29. The lockout mechanism of claim 26 wherein the lockout mechanism is in a housing, a ferrule, a sheath at least partially around the input cable, the sheath attaching to the ferrule, the housing having a space, and the ferrule received within in ferrule.

30. The lockout mechanism of claim 29 further comprising an end wall attached to the housing, the end wall having a slot though which a portion of the ferrule extends.

31. The lockout mechanism of claim 26 wherein the inner cable fitting is cylindrical, and the outer cable fitting is cylindrical, the inner cable fitting having a base and a sidewall extending from the base of the input cable fitting, the output cable fitting having a base and a sidewall extending from the base of the outer cable fitting, the end of the sidewall of the inner cable fitting being inside the sidewall and against the base of the outer cable fitting.

32. The lockout mechanism of claim 31 further comprising an opening in the side wall of the outer cable fitting, an indentation in the side wall of the inner cable fitting, the moveable member moving through the opening in the side wall of the outer cable fitting into the indentation.

33. The lockout mechanism of claim 32 wherein the moveable member is a ball mounted in the housing, the cam member being mounted in the housing opposite the opening in the side wall of one of the cable fittings.

34. The lockout mechanism of claim 33 wherein the cam member is elongated and has two cylindrical surfaces, one surface having a larger diameter than the other surface.

35. The lockout mechanism of claim 34 wherein the two cylindrical surfaces are coaxial, the axis of the cylindrical surfaces being parallel to the direction of motion of the cable fittings.

36. The lockout mechanism of claim 22 wherein the input cable fitting has a base and sidewalls extending from the base of the input cable fitting, the output cable fitting having a base and sidewalls extending from the base of the output cable fitting, the end of the sidewalls of one of the inner cable fitting being inside the sidewalls and against the base of the outer cable fitting.

37. The lockout mechanism of claim 36 further comprising an opening through each of the cable fittings, the input cable extending through the opening in the inner cable fitting and the output cable extending into the opening in the outer cable fitting.

38. The lockout mechanism of claim 37 further comprising means on the input cable preventing the input cable from being pulled through the opening in the inner cable fitting.

39. A lockout mechanism for an actuator for selectively preventing normal input from an input device to an output device of the actuator from activating the actuator's output device, the lockout mechanism comprising:

a. a flexible input cable connectable to the input device and a flexible output cable connectable to the output device, each cable being moveable in two directions;

b. an input cable fitting attached to the input cable, the input cable fitting permitting movement of the input cable relative to the input cable fitting when the input cable moves in one direction, the input cable fitting moving with the input cable when the input cable moves in the other direction;

c. an output cable fitting attached to the output cable, the output cable fitting permitting movement of the output cable relative to the output cable fitting when the output cable moves in one direction, the output cable fitting moving with the output cable when the output cable moves in the other direction;

d. a moveable member adjacent the input cable fitting and the output cable fitting, the moveable member being moveable between a normal and a lockout position, the moveable member securing the input cable fitting and the output cable fitting for movement together when the moveable member is in the normal position, the input cable fitting and the output cable fitting being moveable relative each other when the moveable member is in the lockout position, the input cable and the output cable moving together when the input cable fitting and the output cable fitting move together;

e. a cam member adjacent to the moveable member, the cam being positionable between a lockout position permitting the moveable member to be in its lockout position to release the input cable fitting and the output cable fitting from each other and a normal position positioning the moveable member in the normal locked position, to secure the input cable fitting and the output cable fitting together.

40. The lockout mechanism of claim 39 wherein the input cable fitting has a base and sidewalls extending from the base of the input fitting, the output cable fitting having a base and sidewalls extending from the base of the output fitting, the end of the sidewalls of the input cable fitting being inside the sidewalls and against the base of the output cable fitting.

41. The lockout mechanism of claim 40 further comprising an opening through the input fitting, and an opening through the output fitting, the input cable extending through the opening in the input cable fitting and the output cable fitting extending into the opening in the output cable fitting.

42. A lockout mechanism for an actuator for selectively preventing normal input from an input device to an output device of the actuator from activating the actuator's output device, the lockout mechanism comprising:

a. an input cable connectable to the input device and an output cable connectable to the output device, each of the cables being moveable in two directions;

b. an input cable fitting attached to the input cable, the input cable fitting having a longitudinal axis, the input cable fitting permitting movement of the input cable relative to the input cable fitting when the input cable moves in one direction, the input cable fitting moving with the input cable when the input cable moves in the other direction;

c. an output cable fitting attached to the output cable, the output cable fitting having a longitudinal axis coaxial with the longitudinal axis of the input cable fitting, the output cable fitting permitting movement of the output cable relative to the output cable fitting when the output cable moves in one direction, the output cable fitting moving with the output cable when the output cable moves in the other direction;

d. a moveable member adjacent the input cable fitting and the output cable fitting, the moveable member being moveable between a normal and a lockout position, the moveable member securing the input cable fitting and the output cable fitting for movement together when the moveable member is in the normal position, the input cable fitting and the output cable fitting being moveable relative each other when the moveable member is in the lockout position, the input cable and the output cable moving together when the input cable fitting and the output cable fitting move together;

e. a cam member adjacent to the moveable member, the cam being positionable between a lockout position permitting the moveable member to be in its lockout position to release the input cable fitting and the output cable fitting from each other and a normal position positioning the moveable member in the normal locked position, to secure the input cable fitting and the output cable fitting together.

* * * * *